United States Patent
Lewis

(10) Patent No.: US 10,904,818 B2
(45) Date of Patent: Jan. 26, 2021

(54) DISTRIBUTED ANTENNA SYSTEM PROVIDING REDUNDANCY

(71) Applicant: Maven Wireless Sweden AB, Kista (SE)

(72) Inventor: Michael Lewis, Märsta (SE)

(73) Assignee: Maven Wireless Sweden AB

( * ) Notice: Subject to any disclaimer, the term of this patent is extended or adjusted under 35 U.S.C. 154(b) by 0 days.

(21) Appl. No.: 16/486,198

(22) PCT Filed: Jan. 9, 2018

(86) PCT No.: PCT/EP2018/050457
§ 371 (c)(1),
(2) Date: Aug. 15, 2019

(87) PCT Pub. No.: WO2018/149557
PCT Pub. Date: Aug. 23, 2018

(65) Prior Publication Data
US 2020/0008128 A1    Jan. 2, 2020

(30) Foreign Application Priority Data

Feb. 15, 2017   (SE) ...................................... 1750140

(51) Int. Cl.
*H04W 40/22*   (2009.01)
*H04L 12/24*   (2006.01)
(Continued)

(52) U.S. Cl.
CPC ......... *H04W 40/22* (2013.01); *H04L 41/0668* (2013.01); *H04L 45/121* (2013.01);
(Continued)

(58) Field of Classification Search
CPC ... H04W 40/22; H04W 40/04; H04W 88/085; H04L 41/0668; H04L 45/121; H04L 45/22; H04L 45/24
See application file for complete search history.

(56) References Cited

U.S. PATENT DOCUMENTS 5,455,569 A * 10/1995 Sherman ............... H04W 80/02
                                                          370/228
6,848,006 B1   1/2005 Hermann
(Continued)

FOREIGN PATENT DOCUMENTS

EP       0994635 A1    4/2000
EP       1713290 A1   10/2006
(Continued)

OTHER PUBLICATIONS

International Preliminary Report on Patentability for International Application No. PCT/EP2018/050457, dated Jan. 23, 2019—20 pages.
(Continued)

*Primary Examiner* — Mehmood B. Khan
(74) *Attorney, Agent, or Firm* — RatnerPrestia

(57) ABSTRACT

A method of configuring a distributed antenna system ("DAS") having digital remote units configured to provide a DAS interface to wireless communication devices connecting to the DAS, and at least one digital master unit configured to provide a DAS interface to base stations connecting to the DAS. The method includes connecting digital remote units such that each digital remote unit is connected either to at least another digital remote unit and the digital master unit or to at least two other digital remote units. The method further includes connecting at least one of the digital remote units either to other the digital remote units and the digital master unit, or to at least three other digital remote units, and
(Continued)

connecting the digital master unit to at least two of the digital remote units, thereby providing at least one path for redundant data transport.

21 Claims, 6 Drawing Sheets

(51) Int. Cl.
    *H04L 12/727*     (2013.01)
    *H04L 12/707*     (2013.01)
    *H04W 40/04*     (2009.01)
    *H04W 88/08*     (2009.01)

(52) U.S. Cl.
    CPC .............. *H04L 45/22* (2013.01); *H04L 45/24* (2013.01); *H04W 40/04* (2013.01); *H04W 88/085* (2013.01)

(56) References Cited

U.S. PATENT DOCUMENTS

| | | | |
|---|---|---|---|
| 7,362,709 B1 | 4/2008 | Hui et al. | |
| 8,737,300 B2 | 5/2014 | Stapleton et al. | |
| 8,879,604 B2* | 11/2014 | Woo .......................... | H04L 5/06 375/133 |
| 8,989,046 B1* | 3/2015 | Train ....................... | H04L 45/02 370/252 |
| 10,129,889 B1 | 11/2018 | Marupaduga et al. | |
| 2004/0096222 A1 | 5/2004 | Cagenius | |
| 2004/0156345 A1* | 8/2004 | Steer ........................ | H04L 45/12 370/338 |
| 2004/0205105 A1* | 10/2004 | Larsson ................... | H04L 45/00 709/200 |
| 2005/0031045 A1* | 2/2005 | Mayor ................. | H04B 1/7115 375/260 |
| 2007/0177512 A1* | 8/2007 | Alexander .............. | H04L 45/12 370/238 |
| 2010/0020685 A1 | 1/2010 | Short et al. | |
| 2010/0278530 A1 | 11/2010 | Kummetz et al. | |
| 2011/0111700 A1* | 5/2011 | Hackett .................. | A01G 25/16 455/41.2 |
| 2013/0064076 A1* | 3/2013 | Periyalwar ............ | H04L 41/044 370/228 |
| 2013/0064233 A1* | 3/2013 | Hethuin ................ | H04W 84/18 370/338 |
| 2013/0122830 A1* | 5/2013 | Wang .................... | H04B 17/391 455/78 |
| 2013/0286817 A1* | 10/2013 | Allan ...................... | H04L 45/48 370/221 |
| 2015/0098372 A1 | 4/2015 | Zavadsky et al. | |
| 2015/0264626 A1* | 9/2015 | Perdomo ............... | H04W 40/12 370/216 |
| 2016/0127101 A1 | 5/2016 | Hanson et al. | |
| 2016/0323882 A1 | 11/2016 | Yang et al. | |
| 2017/0085405 A1 | 3/2017 | Xu et al. | |
| 2017/0310595 A1* | 10/2017 | Avidar .................. | H04L 45/124 |
| 2017/0317722 A1 | 11/2017 | Lange | |
| 2017/0367061 A1* | 12/2017 | Kim ........................ | H04B 17/10 |
| 2018/0013787 A1* | 1/2018 | Jiang ...................... | H04L 29/06 |
| 2018/0124729 A1 | 5/2018 | Hanson | |
| 2018/0139680 A1* | 5/2018 | Hui ........................ | H04W 40/16 |

FOREIGN PATENT DOCUMENTS

| | | |
|---|---|---|
| EP | 2352358 A1 | 8/2011 |
| EP | 2731273 A1 | 5/2014 |
| WO | 2013009483 A2 | 1/2013 |
| WO | 2014026005 A1 | 2/2014 |
| WO | 2015151086 A1 | 10/2015 |

OTHER PUBLICATIONS

International Search Report and Written Opinion for International Application No. PCT/EP2018/050457, dated Mar. 8, 2018—15 pages.
Labourdette et al., "Invited: Routing Strategies for Capacity-Efficient and Fast-Restorable Mesh Optical Networks", Photonic Network Communications, 4:3/4, 219-235, 2002.
Pato et al., "Method for Guaranteeing Survivability in Wireless Optical Networks", IP.com Journal, Aug. 9, 2010—pp. 81-89.
Rak, J., "K-Penalty: A Novel Approach to Find K-Disjoint Paths with Differentiated Path Costs", IEEE Communications Letters, vol. 14, No. 4, Apr. 2010—pp. 354-356.
Swedish Office Action for Swedish Application No. 1750140-4, dated Oct. 16, 2017—10 pages.
Final Office Action for U.S. Appl. No. 16/488,075, dated Aug. 13, 2020, 19 pages.
Non Final Office Action for U.S. Appl. No. 16/488,075, dated Feb. 20, 2020, 20 pages.
Notice of Allowance for U.S. Appl. No. 16/488,075, dated Nov. 23, 2020, 14 pages.

* cited by examiner

DISTRIBUTED ANTENNA SYSTEM PROVIDING REDUNDANCY

This application is a U.S. National Phase application of PCT International Application No. PCT/EP2018/050457, filed Jan. 9, 2018, which claims the benefit of Swedish Application SE 1750140-4, filed Feb. 15, 2017, both of which are incorporated by reference herein.

TECHNICAL FIELD

The invention relates to a distributed antenna system (DAS) and methods of configuring the DAS.

BACKGROUND

A distributed antenna system (DAS) is a technology for providing radio coverage in an area which cannot be directly served from the general mobile radio network (for example, tunnels in a metro system, or a building complex), and is particularly advantageous in applications where multiple wireless service providers need to provide coverage since a single DAS can be used with many radio base stations.

A typical digital DAS is shown in FIG. 1 and consists of head-end equipment, herein referred to as digital master units (DMUs) 14, 15, which receive downlink signals from a number of radio base stations (RBSs) 10-13, and convert them for transport on optical fibres 16, 17 via one or more routing units (RUs) 18 to a number of remote nodes 19, 20, herein referred to as digital remote units (DRUs), located in the coverage area which convert the optical signals into radio signals which can be broadcast on antennas driven by the DRUs 19, 20 for transport to/from wireless communication devices 21, 22 such as smart phones and tablets. Each DRU 19, 20 receives uplink signals from its connected antenna(s) and converts them for transmission over the optical fibres 16, 17 back to the DMUs 14, 15 and onward to the RBSs 10-13.

Older generations of active DAS transmit radio signals in analogue form on the optical fibers where DRUs are connected with optical splitter/combiner modules; as a consequence all DRUs connected to the same fiber receive the same combination of signals (though possibly with a number of different sets of signals in parallel through optical wavelength division multiplexing).

Modern active DAS, as that illustrated in FIG. 1, transport the radio signals in the form of digital samples, usually over fiber optic connections though not always. Digital data transport allows for flexible routing and distribution of radio signals with a much finer degree of control over which signals go to which DRU, though with the penalty of added complexity since it is no longer possible to combine uplink signals via passive optical combiners: the digital uplink samples must be summed together at an active node in the system using digital signal processing before transmitting onward. The most practical way to achieve such a configuration is with a daisy-chained connection of DRUs where each DRU has two or more data connectors and can forward signals between the connectors, extracting downlink signals and adding in its own uplink signals as appropriate.

An example of such a solution is shown in FIG. 2. The DMU interfaces with one or more base stations and sends the signals over a daisy-chained network of DRUs.

An alternative solution is to use a star topology where signal distribution is concentrated at a limited number of hub nodes which can connect to many DRUs. However, for a high-capacity digital DAS it becomes impractical to implement a single hub with many connections since available devices with the required number of connections are expensive, and the complexity of the routing scales with the square of the number of connections if any-to-any routing is to be supported.

Mobile operators are keen to avoid service outages in the event of equipment failures (for example, a broken fiber connection or a failed system node). For public safety radio networks a loss of service can be critical. As a result, radio networks as a whole and the DASs which form part of them typically have a requirement to continue functioning in the event of the failure of an individual system component so that there is time to replace the failed component in a planned way with controlled outages.

To meet these requirements, it is necessary that there must exist more than one path between a DMU and any DRU, and at least one path must remain functional in the event of failure of a single node or connection between nodes. For older generation analogue DAS this is typically achieved by installing redundant fibers so that signals still reach the destination in the event of one fiber being interrupted. Fibers are usually installed as bundles routed together, which adds the risk that several fibers may be broken in one incident. A ring configuration may be used in this case with signals being sent in opposite directions round the ring, so that even if both fibers are disrupted at some point round the ring there is still a bidirectional path for all nodes connected in the ring.

Where passive combining is used, the failure of a single node need not affect other nodes connected to the same fiber (as long as the failed node does not transmit noise on the fiber as a result of its failure). However when active combining is done, as is the case in a digital DAS, failure of a node also interrupts the flow of data across the node. Here a ring topology can also be of use.

U.S. Pat. No. 8,737,300B2 describes the use of a ring topology to provide redundancy in a digital active DAS, where each DRU in the ring is connected to a single neighbor in each direction, with the ring emanating from a DMU. This configuration is shown in FIG. 3.

Once redundant paths are in place, it is possible to implement different forms of redundant fail-over. For example, switched redundancy may be used (where failure of the main path is detected and signals are switched over to use the redundant path), or combining may be used whereby the signals from the main and redundant paths are summed together so that loss of one path will only cause a reduction in signal strength, without a loss of signal during the time needed to detect the failure condition.

A typical radio network is too large to be served by a single DMU. One of the main advantages of a digital DAS is that any signal from a DMU typically can be routed to any DRU. As long as a path exists with adequate link bit rate capacity between a DMU and a DRU then the data can be routed, and again it is important to build the system with redundant interconnections. One way in which this can be achieved is by using additional connections on the master nodes to connect them together, such as the redundant ring configuration shown in FIG. 3. Failure of one of the links between the DMUs will still allow signals to be routed (as long as adequate link bit rate capacity is present on the remaining links).

While ring topologies are useful for achieving redundancy, it is unsafe to connect a large number of DRUs in a ring since the risk of failure of more than one node begins to increase. Also, if the DMU to which the ring is connected fails then all DRUs in that particular ring lose connection to the rest of the DAS. A star topology relying on central hub units is even more vulnerable since failure of the hub unit will knock out all connected units.

SUMMARY

An object of the present invention is to solve, or at least mitigate, this problem and provide an improved method of configuring a digital DAS.

This object is attained in a first aspect of the invention by a method of configuring a digital Distributed Antenna System (DAS) comprising a plurality of digital remote units configured to provide a DAS interface to wireless communication devices connecting to the DAS and at least one digital master unit configured to provide a DAS interface to base stations connecting to the DAS. The method comprises connecting at least a subset of the digital remote units such that each digital remote unit in the subset is connected either to at least another one of the digital remote units and the at least one digital master unit or to at least two other of the digital remote units. The method further comprises connecting at least one of the subset of digital remote units either to at least two other of the digital remote units and the at least one digital master unit or to at least three other of the digital remote units, connecting the at least one digital master unit to at least two of the subset of digital remote units, thereby providing at least one path for redundant data transport.

This object is attained in a second aspect of the invention by a digital Distributed Antenna System (DAS). The DAS comprises a plurality of digital remote units configured to provide a DAS interface to wireless communication devices connecting to the DAS and at least one digital master unit configured to provide a DAS interface to base stations connecting to the DAS. The DAS is configured such that at least a subset of the digital remote units is connected such that each digital remote unit in the subset is connected either to at least another one of the digital remote units and the at least one digital master unit or to at least two other of the digital remote units. The DAS is further configured such that at least one of the subset of digital remote units is connected either to at least two other of the digital remote units and the at least one digital master unit or to at least three other of the digital remote units, and the at least one digital master unit is connected to at least two of the subset of digital remote units, thereby providing at least one path for redundant data transport.

Advantageously, with the invention, the previously mentioned problems of ring or star topologies in the prior art can be mitigated, or even eliminated, if all or some of the digital remote units (DRUs) support more than two high-speed connections. This allows the system to be implemented in a "mesh" configuration with distributed connections between nodes, providing multiple possible paths for redundant data transport.

Hence, DAS topologies as proposed in embodiments of the invention provide a higher degree of redundancy in that if links or nodes fail, data transfer along redundant data paths is advantageously provided.

In an embodiment, the DAS is configured such that one or more further DMUs are connected to the at least one DMU, and further to at least two of the plurality of DRUs.

In an embodiment, for any DMU transporting data in a downlink direction to a selected wireless communication device, a main route is advantageously selected for transporting the data from the DMU to the DRU serving the wireless communication device to which the data is to be transported, which main route results in a smallest cost metric of all possible routes in the DAS. For instance, the selected main route may have the smallest total link delay of all possible routes.

In a further embodiment, for any DMU transporting data in a downlink direction to a selected wireless communication device, a redundant route is advantageously selected for transporting the data from the DMU to the DRU serving the wireless communication device to which the data is to be transported, which redundant route results in a second smallest cost metric of all possible routes in the DAS. For instance, the selected redundant route may have the second smallest total link delay of all possible routes.

Advantageously, a DMU thus submits downlink data via the main route and the redundant route. Unless any link failures occur along the main route, the downlink data will arrive at the selected DRU via the main route before the downlink data arrives at the selected DRU via the redundant route. Hence, given that the downlink data already has arrived at the DRU via the main route, the DRU will simply discard the downlink data arriving later via the redundant route. If no data arrives via the main route, a failure has likely occurred in one or more of the links or nodes in the main route, and the DRU will use the data received via the redundant route.

In yet an embodiment, an advantageous criterion when selecting a data routing path is that potential points of failure that are common for the main route and the redundant route should be avoided. In one scenario, such common routing points are avoided altogether for the redundant route. In another scenario, a common routing point may be selected, but is penalized with a cost factor which increases the cost metric of a route that includes the common routing point.

In yet another embodiment, an advantageous criterion when selecting a data routing path is that capacity to accommodate the data to be transported is determined for any routing point. In one scenario, such low-capacity routing points are avoided altogether for the main route and the redundant route. In another scenario, such low-capacity routing point may be selected, but is penalized with a cost factor which increases the cost metric of a route that includes the low-capacity routing point.

Further embodiments of the invention will be discussed in the detailed description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
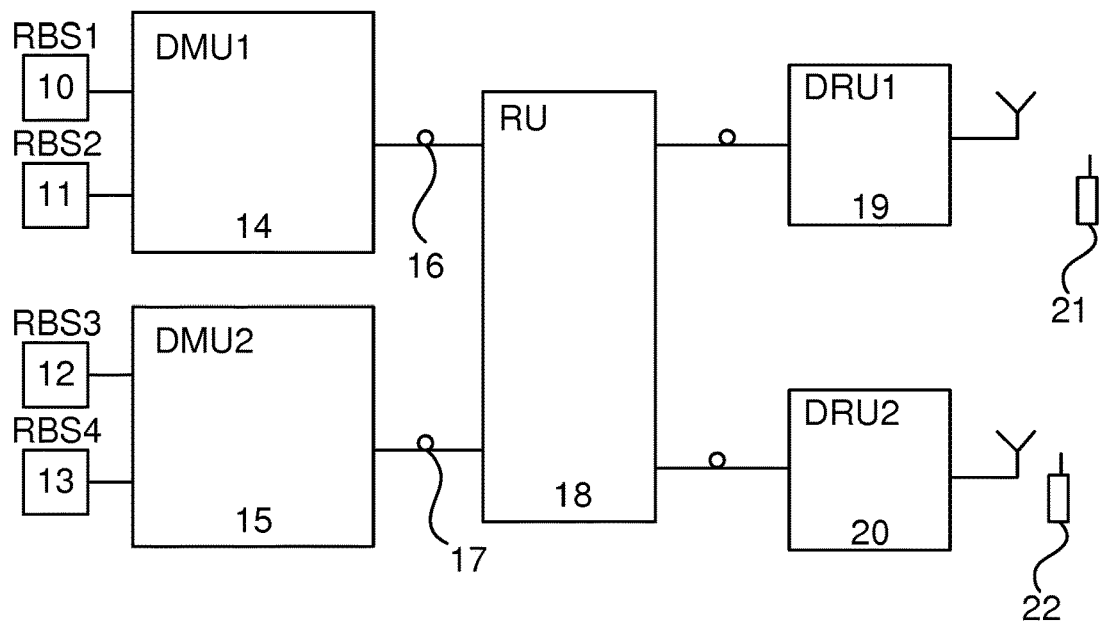
FIG. 1 illustrates a prior art DAS system in which the present invention may be implemented.

FIG. 1 illustrates a typical prior art DAS in which the present invention may be implemented.

Figure 2:
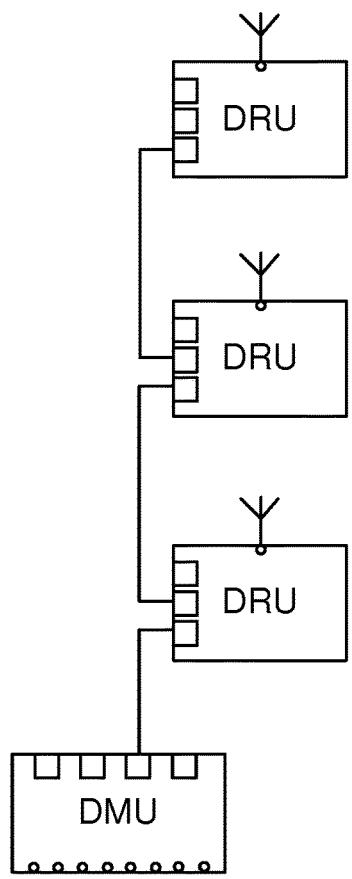
FIG. 2 illustrates a simplified prior art DAS comprising one master unit connecting to three remote units without any provision of redundancy.

FIG. 2 illustrates a simplified DAS comprising one master unit connecting to three remote units without any provision of redundancy.

Figure 3:
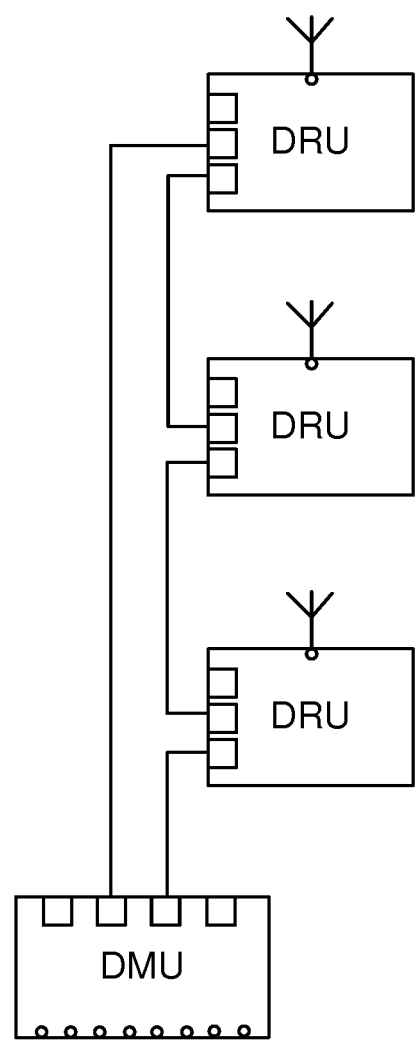
FIG. 3 illustrates a simplified prior art DAS comprising one master unit connecting to three remote units where ring redundancy is provided.

FIG. 3 illustrates a simplified DAS comprising one master unit connecting to three remote units where ring redundancy is provided.

Figure 4:
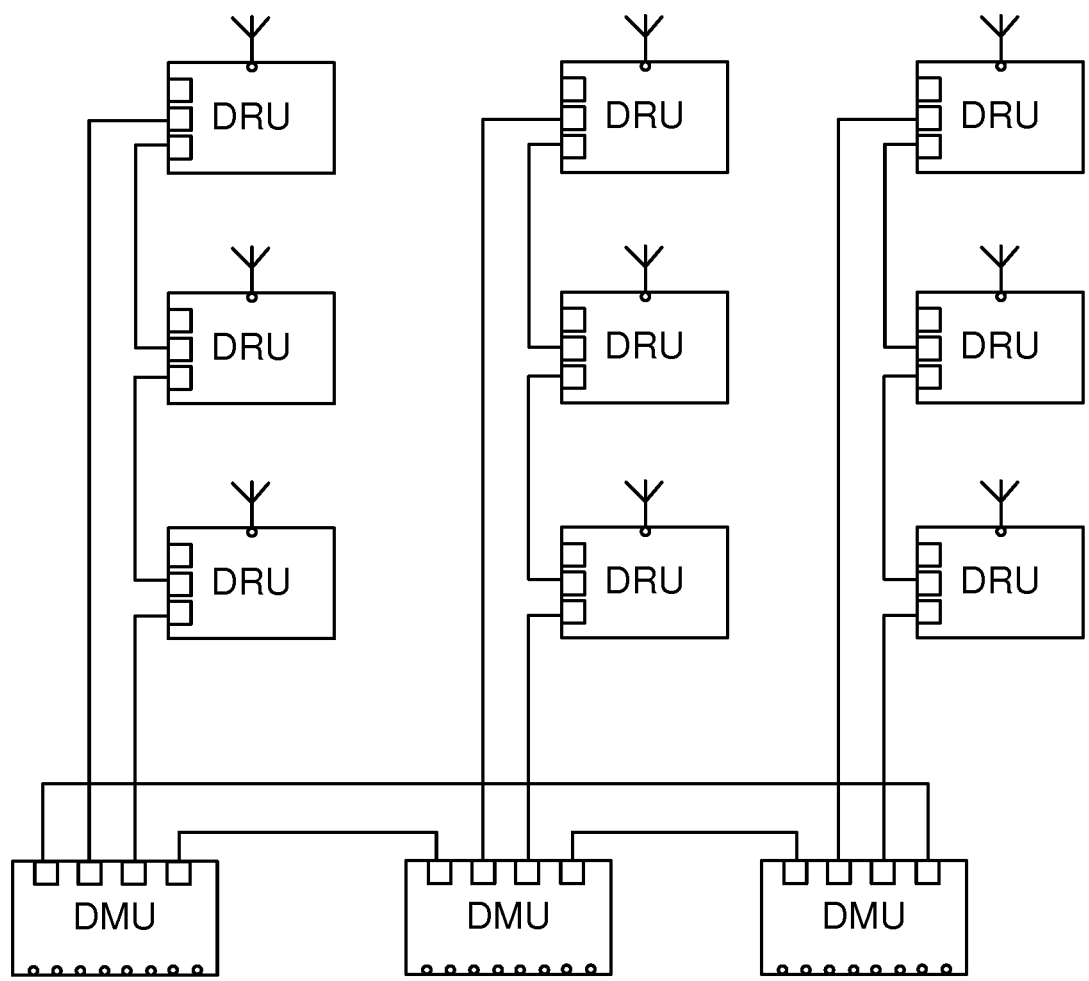
FIG. 4 illustrates a simplified prior art DAS comprising three interconnected master units, each master unit further connecting to three remote units, respectively, to provide ring redundancy.

FIG. 4 illustrates a simplified DAS comprising three interconnected master units, each master unit further connecting to three remote units, respectively, to provide ring redundancy.

FIGS. 1-4 has been previously discussed in will therefore not be discussed further in the following.

Figure 5:
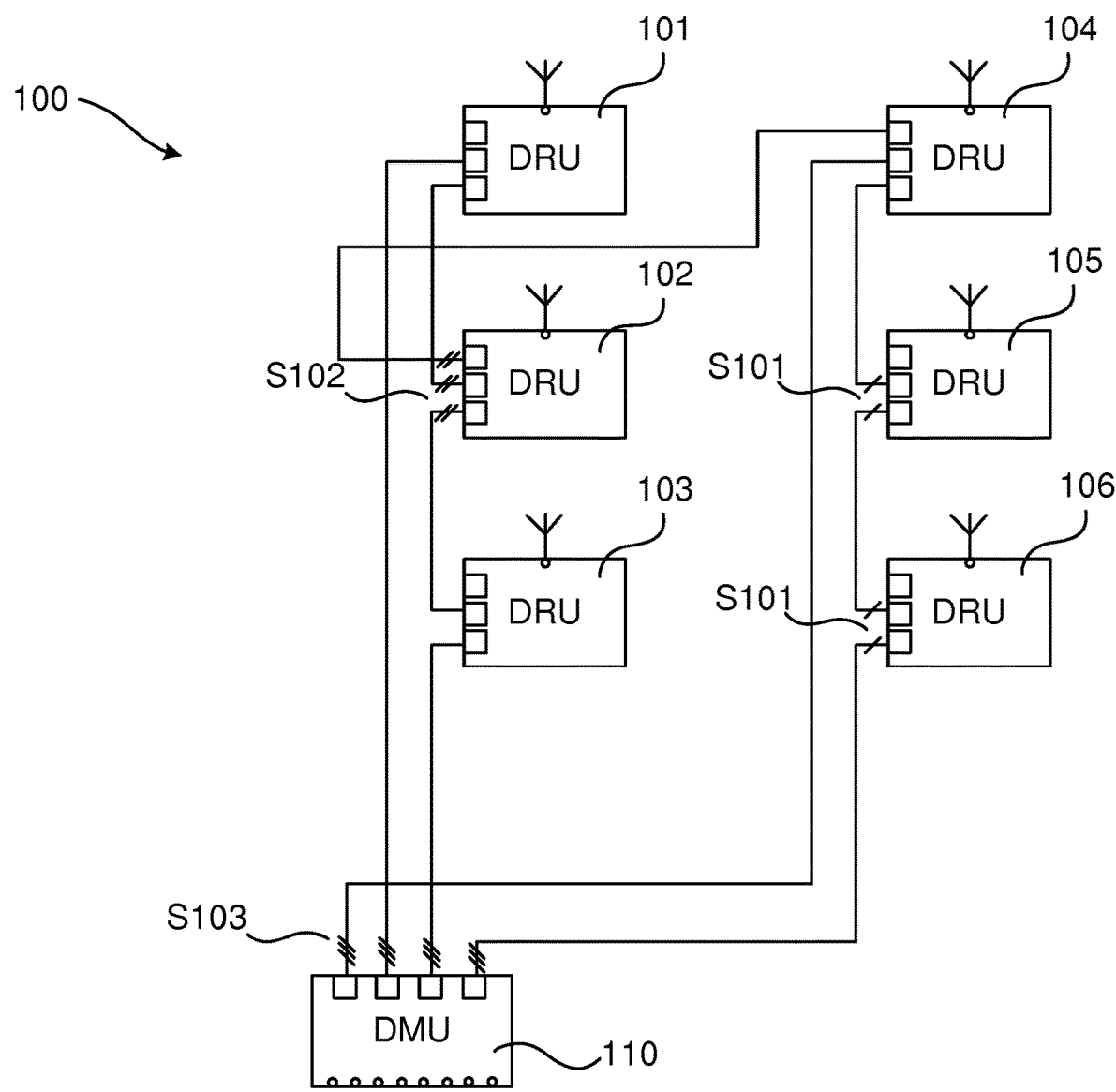
FIG. 5 illustrates a simplified DAS according to an embodiment of the invention, where the previously discussed problems relating to lack of redundancy is overcome.

FIG. 5 illustrates a simplified DAS 100 according to an embodiment of the invention, where the previously discussed problems relating to lack of redundancy is overcome.

Hence, a digital master unit (DMU) 110 connects to a first digital remote unit (DRU) 101, which in its turn connects to a second DRU 102, and so on.

As can be seen, each DRU connects to either at least two other DRUs (for instance fifth DRU 105 connecting to fourth DRU 105 and sixth DRU 106, indicated with S101), or to another one of the DRUs and the DMU 101 (for instance the sixth DRU 106 connecting to the fifth DRU 105 and the DMU 110, also indicated with S101). In the embodiment, at least a subset of the DRUs 101-106 is connected either to at least another one of the DRUs and to the DMU 110 or to at least two other of the DRUs.

For instance, second DRU 102 is connected to first DRU 101, the fourth DRU 104 and the DMU 110, indicated with S102.

Even though each of the DRUs in FIG. 5 is connected to at least two other units (either in the form of another two DRUs or one further DRU and the DMU), it can be envisaged that one or more of DRUs is connected to a single further unit, either in the form of another DRU or the DMU.

The DMU 110 preferably connects to at least two DRUs. However, in this particular exemplifying embodiment, the DMU 110 connects to the first DRU 101, the third DRU 103, the fourth DRU 106 and the sixth DRU 106, indicated with S103.

The previously mentioned problems of ring or star topologies can be mitigated or even eliminated if all or some of the DRUs support more than two high-speed connections. This allows the system to be implemented in a "mesh" configuration with distributed connections between nodes, providing multiple possible paths.

In FIG. 5, the second DRU 102 connects to a third of the DRUs—namely to the fourth DRU 104—in addition to connecting to the first DRU 101 and the second DRU 103, and the fourth DRU 104 connects to the second DRU 102, the fifth DRU 105 and the DMU 110. Hence, in this embodiment, at least one of the subset of digital remote units 101-106 connects either to at least two other of the DRUs and the DMU 110 or to at least three other of the DRUs.

Hence, as compared to the previously discussed topologies, the topology proposed in the embodiment of the DAS 100 illustrated in FIG. 5 provides a higher degree of redundancy in that if for instance the respective link between the second DRU 102 and the first DRU 101 and between the second DRU 102 and the third DRU 103 would fail, the DAS is still advantageously capable of routing data to/from the second DRU via the fourth DRU 104. Hence, a redundant data path is advantageously provided.

As will be discussed in detail in the following, any routing of data to/from a DMU from/to a DRU will occur over a main route and over a redundant route. This should be performed for the majority of the DRUs in the DAS, even though it can be envisaged that a few of the DRUs in the DAS will not have access to a redundant route.

In practice, it is likely that a DAS comprises multiple digital master units for handling a plurality of radio base stations.

Figure 6:
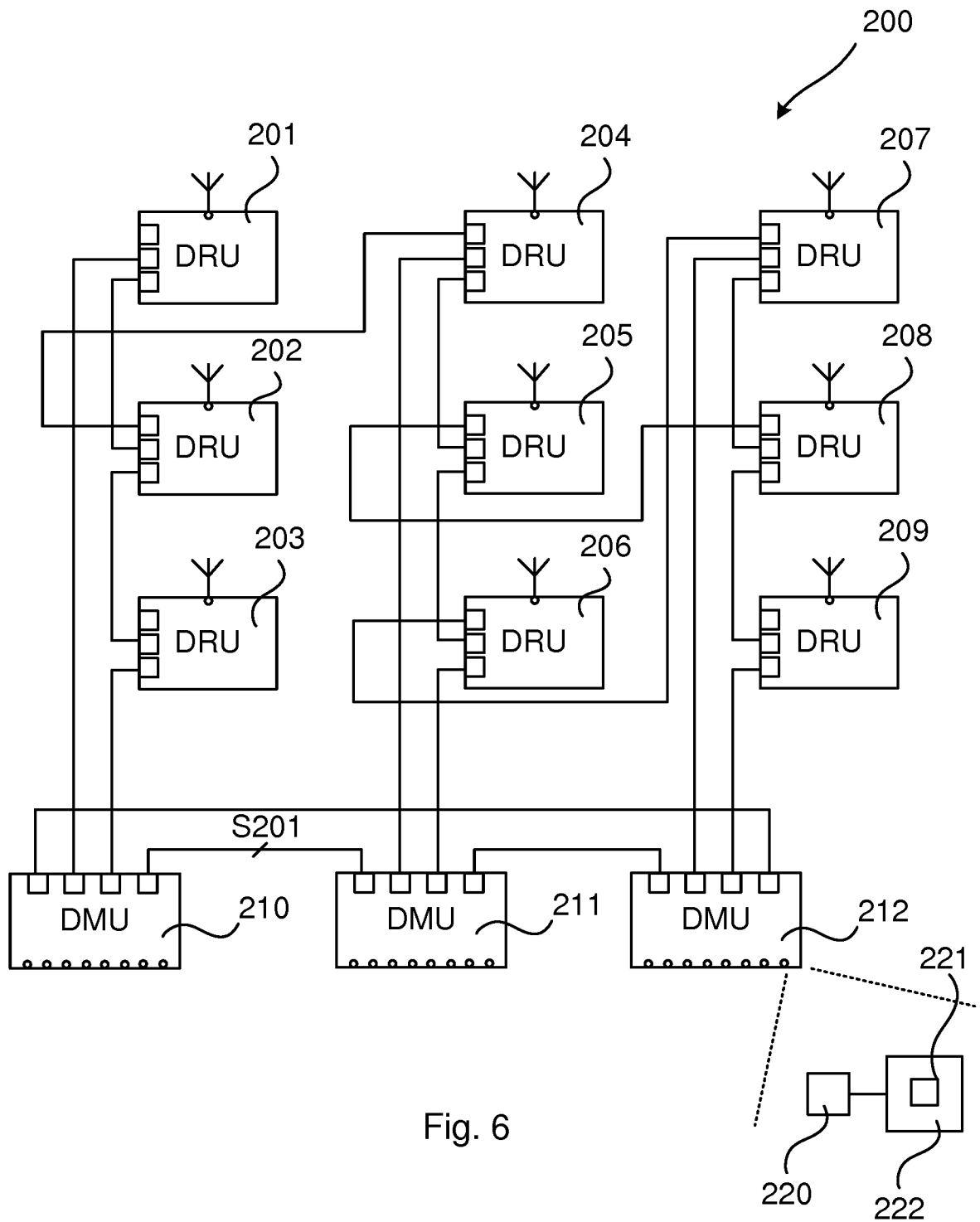
FIG. 6 illustrates a simplified DAS according to a further embodiment of the invention comprising a plurality of master units.

FIG. 6 illustrates a simplified DAS 200 according to a further embodiment of the invention comprising three DMUs 210, 211, 212. In FIG. 6, the DMUs 210-212 are directly connected either to DRUs or another DMU. However, it is envisaged that the DMUs 210-212 may be indirectly connected either to DRUs or another DMU via one or more intermediate nodes, such as a switches and/or routing units.

Hence, first DMU 210 is connected to at least a second DMU 211, indicated with S201.

In this embodiment, to provide an even higher degree of redundancy, the three DMUs 210, 211, 212 are interconnected (either directly or indirectly via further network nodes).

With reference to FIG. 6, all units in the DAS typically comprise processing devices. In practice, any routing determined by e.g. the third DMU 212 is performed by a processing unit 220 (or system of processing units) embodied in the form of one or more microprocessors arranged to execute a computer program 221 downloaded to a suitable storage medium 222 associated with the microprocessor, such as a Random Access Memory (RAM), a Flash memory or a hard disk drive. The processing unit 220, in cooperation with other processing units in the system, is arranged to cause the DAS 100 to carry out the method according to embodiments when the appropriate computer program 221 comprising computer-executable instructions is downloaded to the storage medium 222 and executed by the processing unit 220. The storage medium 222 may also be a computer program product comprising the computer program 221. Alternatively, the computer program 221 may be transferred to the storage medium 222 by means of a suitable computer program product, such as a Digital Versatile Disc (DVD) or a memory stick. As a further alternative, the computer program 221 may be downloaded to the storage medium 222 over a network. The processing unit 220 may alternatively be embodied in the form of a digital signal processor (DSP), an application specific integrated circuit (ASIC), a field-programmable gate array (FPGA), a complex programmable logic device (CPLD), etc.

As further can be seen in FIG. 6, the additional redundancy achieved by providing three or more high-speed links for one or more of the DRUs is advantageously attained by DRUs 202, 204, 205, 206, 207 and 208.

As an example, assuming that the second DMU 211 wishes to submit downlink data to a wireless communication device served by the second DRU 102, the second DMU 211 would have a number of options, three of which will be discussed in the following.

1) The second DMU 211 routes the downlink data via the first DMU 210 and the third DRU 203 to the second DRU 202.
2) The second DMU 211 routes the downlink data via the first DMU 210 and the first DRU 201 to the second DRU 202.
3) The second DMU 211 routes the downlink data via the fourth DRU 204 to the second DRU 202.

In an embodiment, the selected route to a destination node is the route having the smallest total link delay. If it for simplicity is assumed that all links have the same delay T; option 1) would result in a total route delay of 3 T, option 2) would also result in a total route delay of 3 T, while option 3) would result in a total route delay of 2 T.

Hence, option 3) would be selected as a main route for transporting downlink data from the second DMU 211 to the second DRU 202.

As a redundant route for transporting downlink data from the second DMU 211 to the second DRU 202, either one of options 1) and 2) is selected.

The second DMU 211 thus submits the downlink data via the main route and the redundant route. Unless any link failures occur along the main route, the downlink data will arrive at the second DRU 202 before the downlink data arriving at the second DRU 202 via the redundant route. Hence, given that the downlink data already has arrived at the second DRU 202 via the main route, the second DRU 202 will simply discard the downlink data arriving later via the redundant route (and if no data arrives via the main route, a failure has likely occurred in one or more of the links or nodes in the main route).

For these multiple paths making up the route from the transferring unit to the destination unit to be effectively utilized, the DAS must set up the routing appropriately to exploit the redundancy. In a simple ring topology such as that shown in FIG. 3, the redundant paths are immediately obvious and can be more or less determined at the time the system is designed. However, for a system with mesh interconnections as proposed by the invention, it is necessary to automate the process of determining optimum routing.

In a further embodiment, the routing must further be undertaken such that the total routed bit rate across any link in the route does not exceed the available bit rate on that link. The routing selection must thus take into account bit rate capacity of each link via which the data is routed.

Hence, in this embodiment, when determining a route based on a minimal route delay criterion (or any other appropriate criterion), a link that cannot accommodate the amount of data to be sent will not be selected, whereas in another embodiment, the link can be selected but will be penalized with a greater link delay. In such a case, the DMU submitting the data will most likely have to decrease the rate of the submitted data.

In a further embodiment, the respective link delay is determined by actually measuring the delay of each link. However, if that is not possible or meaningful, an appropriate estimated delay is assigned to each link. All links may be given the same estimated delay, or alternatively different links are given different estimated delays.

In yet another embodiment, a criterion when selecting a data routing path is that potential points of failure common for the main route and the redundant route should be avoided. Hence, due to the risk of failure, any common routing points should be avoided.

Again with reference to FIG. 6, assuming that downlink data is to be delivered from the second DMU 211 to a wireless communication device served by the eighth DRU 208; the second DMU 211 would have plenty of routing options, four of which would result in the same total link delay given that each link has the same delay, which four options will be discussed in the following.

a) The second DMU 211 routes the downlink data via the sixth DRU 206 and the fifth DRU 205 to the eighth DRU 208.
b) The second DMU 211 routes the downlink data via the fourth DRU 204 and the fifth DRU 205 to the eighth DRU 208.
c) The second DMU 211 routes the downlink data via the third DMR 212 and the ninth DRU 209 to the eighth DRU 208.
d) The second DMU 211 routes the downlink data via the third DMR 212 and the seventh DRU 207 to the eighth DRU 208.

Now, using options a) and b) as main and redundant routes is not preferable in this particular embodiment, since the fifth DRU 205 and the link from the fifth DRU 205 to the eight DRU 208 are common to both these routes.

As a consequence, if a failure occurs at the fifth DRU 205 and/or in the link from the fifth DRU 205 to the eight DRU 208, neither of the main and redundant route will be capable of carrying data from the second DMU 211 to the eighth DRU 208.

Similarly, using options c) and d) as main and redundant routes is also not preferable in this particular embodiment, since the third DMU 212 and the link from the second DMU 211 to the third DMU 212 are common to both these routes.

As a consequence, if a failure occurs at the third DMU 212 and/or the link from the second DMU 211 to the third DMU 212, neither of the main and redundant routes will be capable of carrying data from the second DMU 211 to the eighth DRU 208.

To overcome the problem of potentially common failure points in this particular example, the second DMU 211 will select either one of options a) and b) as the main route, and either one of options c) and d) as the redundant route (or vice versa), thereby advantageously avoiding any common points of failure for the main and the redundant route.

The second DMU 211 may thus in an embodiment execute an algorithm where total link delay is to be minimized, where in addition to determining the total link delay (using either an actually measured or estimated delay or by using an appropriate cost metric, such as a delay metric, by assigning a delay weight of 1 to one link, 2 to another, 3 to still another, etc.) the link delays have an additional cost factor applied reflecting any common routing points.

Hence, as previously discussed, common routing points may be avoided altogether when selecting a redundant route, but it is also envisaged that common routing point(s) may be selected for a redundant route, but that selection of any common links or nodes are penalized.

For instance, assuming that a given link is considered to have a link delay metric of "1"; if the link is common for the main route and the redundant route, said given link may be assigned a new link delay metric of "2", thereby penalizing the selection of that given link with a higher link delay metric.

To conclude, when determining total link delay (TD) of a route, the delays (T) of the individual links forming the route may in an embodiment be summed together as:

$$TD = \sum_{i=1}^{n} T_i$$

Figure 7:
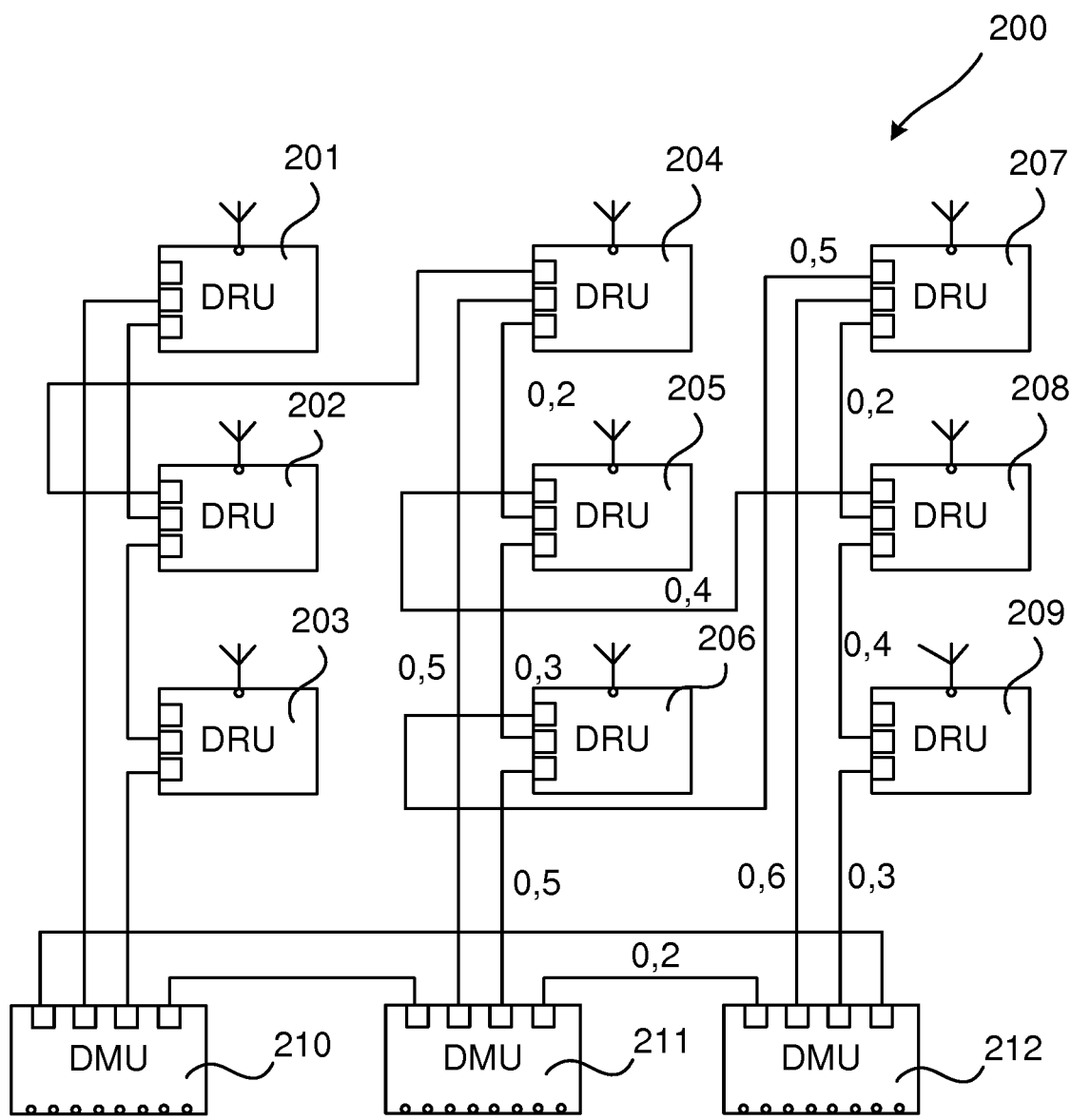
FIG. 7 illustrates the DAS of FIG. 6, but where hypothetical link delay metrics have been included.

To exemplify, reference is made to FIG. 7, which illustrates the DAS 200 of FIG. 6, but where hypothetical link delay metrics have been included.

Again assuming that downlink data is to be delivered from the second DMU 211 to a wireless communication device served by the eighth DRU 208; the four routing options a)-d) previously discussed will again be discussed in the following.
  a) The second DMU 211 routes the downlink data via the sixth DRU 206 and the fifth DRU 205 to the eighth DRU 208; $TD_a$=0.5+0.3+0.4=1.2.
  b) The second DMU 211 routes the downlink data via the fourth DRU 204 and the fifth DRU 205 to the eighth DRU 208; $TD_b$=0.5+0.2+0.4=1.1.
  c) The second DMU 211 routes the downlink data via the third DMU 212 and the ninth DRU 209 to the eighth DRU 208; $TD_c$=0.2+0.3+0.4=0.9.
  d) The second DMU 211 routes the downlink data via the third DMR 212 and the seventh DRU 207 to the eighth DRU 208; $TD_d$=0.2+0.6+0.2=1.0.

Now, only taking into account total link delay—but not any routing points common to the main and redundant route—option d) would be selected as the main, while option c) would be selected as the redundant route, since these two routes has the smallest total link delays.

In the embodiment taking into account negative impact of common routing points, when determining a cost metric (TD) of a route, the delays (T) of the individual links forming the route may in an embodiment be combined with a loss-of-redundancy cost factor before being summed together:

$$TD = \sum_{i=1}^{n} w_{com} T_i$$

where $w_{com}$ denotes a cost factor for common routing points. Typically, the cost factor $w_{com}$ would only be applied to the redundant route, but not to the selected main route.

In this particular example, a common routing point is penalized with $w_{com}$=3 for any possible redundant route that includes the common routing point.

Hence, in this example, the total delay of option c) would still be $TD_c$=0.2+0.3+0.4=0.9, thereby making option c) the main route selection.

However, for option d), the link between the second DMU 211 and the third DMU 212 will be penalized, resulting in cost metric $TD_d$=(0.2×3)+0.6+0.2=1.4.

As can be seen, option d) would no longer be selected as redundant route when taking into account common routing points. Instead, option b) has the second smallest cost metric, in this example being a total link delay metric: $TD_b$=1.1.

It is noted that the eighth DRU 208 will use the same main route and redundant route to the second DMU 211 when uplink data is to be transmitted to the second DMU 211.

In another exemplifying embodiment, the cost factor is not applied in a multiplicative manner, but is additively applied:

$$TD = \sum_{i=1}^{n} (T_i + R_i)$$

where $R_i$ denotes an additive cost factor for common routing points.

Using the link delays of FIG. 7, and assuming that $R_i$=1 for common routing points; the cost metric of option c) would still be $TD_c$=0.2+0.3+0.4=0.9, thereby making option c) the main route selection.

However, for option d), the link between the second DMU 211 and the third DMU 212 will be penalized, resulting in cost metric $TD_d$=(0.2+1)+0.6+0.2=2.0.

As can be seen, option d) would no longer be selected as redundant route when taking into account common routing points and an additive cost factor $R_i$. Instead, option b) has the second smallest cost metric, in this example having cost metric: $TD_b$=1.1.

In the embodiments described with reference to FIGS. 6 and 7, it is assumed that the DMUs and the DRUs do not cause any delays themselves. However, if they would, the delay of the respective node would simply be added to the delay of the corresponding link to determine total link delay from a DMU to a destination DRU.

To conclude, with this embodiment, the routing algorithm executed by the DMUs (or any other appropriate network node) also advantageously takes into account the requirement to maintain a redundant path. This is achieved by adding a cost factor in the search algorithm that penalizes a solution where redundancy is lost (for example, because the main and redundant signals both are routed via the same link, or are routed through the same node, i.e. the signals are routed via at least one common routing point).

The relative size of the redundancy penalties is a decision for the DAS operator, for example:
  Loss of redundancy may be forbidden altogether, a failure will be reported if a fully redundant route can not be found;
  Loss of redundancy may be given a moderate weighting causing a correspondingly moderate increase in the route cost metric, so that redundancy may be sacrificed to minimize link delay;
  Loss of redundancy may be given a weighting that is much greater than possible path cost due to link delay, thereby forcing the search algorithm to prioritize redundancy over link delay but still find a solution in the event that redundancy can not be maintained.

In situations where full redundancy cannot be achieved due to a lack of available routing paths, the system user interface could issue an alarm highlighting the segments of the route which are a common failure point.

The problem of finding the optimal routing between two nodes in a graph (considering only link delay) is a shortest path problem which has been widely studied. For example, Dijkstra's algorithm can be used to find the lowest-delay path from each DMU to each DRU in the DAS or the Floyd-Warshall algorithm can be used to efficiently find the lowest delay path between any two nodes. However, in practice the DAS has dynamically changing link capacity utilization depending on which data signals are currently routed to which locations. These capacity limitations mean that not all links may be available for routing a certain signal, depending on the capacity requirements of that signal. These limitations have the effect of placing "barriers" in the graph which must be routed around. Heuristic-driven algorithms such as the so called A* search algorithm give an efficient way of finding the optimum solution in such a case, where the heuristic from each node is given by the minimum delay calculated from that node disregarding link capacity.

As previously has been mentioned, when determining a route based on a minimal route delay criterion (or any other appropriate criterion), a link that cannot accommodate the amount of data to be sent will not be selected in an embodiment, whereas in another embodiment the link can be selected but will be penalized with a greater link delay.

In the embodiment taking into account negative impact of limited capacity over a link, when determining cost metric (TD) of a route, the delays (T) of the individual links forming the route may in an embodiment be weighted with a capacity cost factor $w_{cap}$ before being summed together:

$$TD = \sum_{i=1}^{n} w_{cap} w_{com} T_i$$

Hence, if a routing point (i.e. a link and/or a node) is selected which cannot accommodate the data to be transmitted; the link delay metric will be multiplied with capacity cost factor $w_{cap}>1$. It should be noted that this weighting will be applied when selecting the redundant route as well as when selecting the main route.

In the above embodiment described with reference to FIG. 7, the main path is determined first (without any additional cost for redundancy). The routing algorithm will in this case calculate the lowest possible delay for the main route, which typically is desirable since the main route will be the one used in any situation other than a failure. After the main path is determined, the redundant route is determined by taking into account penalizing weights for routing points common with the main route.

It is noted that in the case of introducing a capacity cost factor, the cost factor may be additively applied, as previously described.

The previously described embodiment which first determines the main route and then determines the redundant route could lead to a total delay for the redundant path which is greater than could be achieved if the main route delay is allowed to increase.

In an alternative embodiment, the main route and the redundant route are determined simultaneously.

Where redundant combining requires the delays between the two routes to be balanced there is no benefit in finding a lower delay for the main path since it any case needs to be artificially delayed to match the redundant route delay. Instead, the two routes may be optimized together in order to balance delays. In this case the search algorithm has an added degree of freedom in that the possible changes of state between each iteration of the search are defined by the possible next step taken by each of the main and redundant routes individually and the cost of each link forming the respective route is defined as the sum of the costs of the steps taken for each of the main and redundant routes, plus any additional cost due to loss of redundancy. The search algorithm can still be guided by the same heuristics as used in the single route case; the heuristic for each state is defined as the sum of the heuristics for each route. With this approach it is, in addition, possible to assign different relative weightings to link delay on the main and redundant routes (so it is still possible to give some prioritization to the main path over the redundant path if desired).

Again with reference to FIG. 6, a further embodiment of the invention will be described.

The previously described embodiments have focused on redundancy for the signal routing between a digital master unit and a digital remote unit. However, there is an additional failure mode whereby a DMU itself fails. In this case, it is desirable to be able to specify an alternative signal source from a redundant DMU to provide an additional option for fallback in case of DMU failure.

In this exemplifying embodiment, the second DMU 211 typically serves a first set of DRUs (i.e. DRUs 204, 205, 206), while the third DMU 212 typically serves a second set of DRUs (i.e. DRUs 207, 208, 209).

As can be seen, the third DMU 212 further serves the first set of DRUs 204-206 with signals transported via the second set of DRUs 207-209.

Hence, if the second DMU 211 should fail, the signals of the third DMU are advantageously already redundantly routed to the first set of DRUs 204-206.

In yet an embodiment, at least one of the base stations (not shown) connected to the second DMU 211 is configured such that it forms a neighboring cell to at least one of the base stations connected to the third DMU 212.

Advantageously, any wireless communication devices served by the first set of DRUs 204-206 may be instructed to hand over to any one the DRUs 207-209 in the second set, thereby reducing any downtime where the wireless communication devices are searching for a new signal as an alternative to the lost signal from the second DMU 211.

The invention has mainly been described above with reference to a few embodiments.

However, as is readily appreciated by a person skilled in the art, other embodiments than the ones disclosed above are equally possible within the scope of the invention, as defined by the appended patent claims.

The invention claimed is:

1. A method of configuring a digital Distributed Antenna System ("DAS"), comprising a plurality of digital remote units configured to provide a DAS interface to wireless communication devices connecting to the DAS and at least one digital master unit configured to provide a DAS interface to base stations connecting to the DAS, the method comprising:

connecting at least a subset of the digital remote units such that each digital remote unit in the subset is connected either to at least another one of the digital remote units and the at least one digital master unit or to at least two other of the digital remote units;

connecting at least one of the subset of digital remote units either to at least two other of the digital remote units and the at least one digital master unit or to at least three other of the digital remote units;

connecting the at least one digital master unit to at least two of the subset of digital remote units, thereby providing at least one path for redundant data transport;

selecting, for any digital master unit transporting data in a downlink direction to a selected wireless communication device, as a main route for transporting the data from said any digital master unit to the digital remote unit serving the selected wireless communication device, the route resulting in a smallest delay cost metric of all possible routes in the DAS; and selecting as a redundant route for transporting the data from said any digital master unit to the digital remote unit serving the selected wireless communication device the route resulting in a second smallest delay cost metric of all possible routes in the DAS.

2. The method of claim 1, further comprising:
connecting at least one further digital master unit to said at least one digital master unit, said at least one further digital master unit further being connected to at least two of the plurality of digital remote units.

3. The method of claim 1, further comprising:
submitting, by the digital remote unit serving the selected wireless communication device, the data arriving first of the data being transported via the main route and the redundant route from said any digital access unit to the wireless communication device.

4. The method of claim 1, further comprising:
determining routing points being common for the main route and a redundant route; and
selecting an alternative redundant route which avoids the determined common routing points for the main and the alternative redundant route.

5. The method of claim 1, further comprising:
determining routing points being common for the main route and a redundant route; and
penalizing, for the redundant route, each individual routing point being common to the main route and the redundant route, which penalty causes an increased cost metric for the redundant route.

6. The method of claim 1, further comprising:
determining common routing points for the main route and a redundant route; and
penalizing each individual routing point being common to the main route and the redundant route, which penalty causes an increased cost metric for the main route and the redundant route.

7. The method of claim 1, further comprising:
determining routing points which do not have capacity to accommodate the data to be transported; and
selecting the main route and the redundant route such that the routing points which do not have capacity to accommodate the data to be transported are avoided.

8. The method of claim 1, further comprising:
determining routing points which do not have capacity to accommodate the data to be transported; and
penalizing each routing point which do not have capacity to accommodate the data to be transported, which penalty causes an increased cost metric for any route that includes said each routing point which do not have capacity to accommodate the data to be transported.

9. The method of claim 2, further comprising:
connecting the at least two digital master units such that at least a subset of the digital remote units served by a first of the at least two digital master units further is served by a second of the at least two digital master units, wherein a fallback is provided to said subset of digital remote units in case of failure of the first of the at least two digital master units.

10. The method of claim 9, wherein:
the at least two digital master units is configured to each be connected to at least one base station, the at least one base station connected to the first of the at least two digital master units being located in a neighboring cell with respect to the at least one base station connected to the second of the at least two digital master units.

11. A digital Distributed Antenna System ("DAS"), comprising a plurality of digital remote units configured to provide a DAS interface to wireless communication devices connecting to the DAS and at least one digital master unit configured to provide a DAS interface to base stations connecting to the DAS, the DAS being configured such that:
at least a subset of the digital remote units is connected such that each digital remote unit in the subset is connected either to at least another one of the digital remote units and the at least one digital master unit or to at least two other of the digital remote units;
at least one of the subset of digital remote units is connected either to at least two other of the digital remote units and the at least one digital master unit or to at least three other of the digital remote units; the DAS further being characterized in being configured such that
the at least one digital master unit is connected to at least two of the subset of digital remote units, thereby providing at least one path for redundant data transport; the DAS further being configured to
select, for any digital master unit transporting data in a downlink direction to a selected wireless communication device, as a main route for transporting the data from said any digital master unit to the digital remote unit serving the selected wireless communication device, the route resulting in a smallest delay cost metric of all possible routes in the DAS; and
select as a redundant route for transporting the data from said any digital master unit to the digital remote unit serving the selected wireless communication device the route resulting in a second smallest delay cost metric of all possible routes in the DAS.

12. The DAS of claim 11, further being configured such that:
at least one further digital master unit is connected to said at least one digital master unit, said at least one further digital master unit further being connected to at least two of the plurality of digital remote units.

13. The DAS of claim 11, further being configured to:
submit, by the digital remote unit serving the selected wireless communication device, the data arriving first of the data being transported via the main route and the redundant route from said any digital access unit to the wireless communication device.

14. The DAS of claim 11, further being configured to:
determine routing points being common for the main route and a redundant route; and
select an alternative redundant route which avoids the determined common routing points for the main and the alternative redundant route.

15. The DAS of claim 11, further being configured to:
determine routing points being common for the main route and a redundant route; and
penalize, for the redundant route, each individual routing point being common to the main route and the redundant route, which penalty causes an increased cost metric for the redundant route.

16. The DAS of claim 11, further being configured to:
determine common routing points for the main route and a redundant route; and penalize each individual routing point being common to the main route and the redundant route, which penalty causes an increased cost metric for the main route and the redundant route.

17. The DAS of claim 11, further being configured to:
determine routing points which do not have capacity to accommodate the data to be transported; and
select the main route and the redundant route such that the routing points which do not have capacity to accommodate the data to be transported are avoided.

18. The DAS of claim 11, further being configured to:
determine routing points which do not have capacity to accommodate the data to be transported; and
penalize each routing point which do not have capacity to accommodate the data to be transported, which penalty causes an increased cost metric for any route that includes said each routing point which do not have capacity to accommodate the data to be transported.

19. The DAS of claim 12, further being configured such that:
the at least two digital master units is connected such that at least a subset of the digital remote units served by a first of the at least two digital master units can be served by a second of the at least two digital master units, wherein a fallback is provided to said subset of digital remote units in case of failure of the first of the at least two digital master units.

20. The DAS of claim 19, wherein:
the at least two digital master units is configured to each be connected to at least one base station, the at least one base station connected to the first of the at least two digital master units being located in a neighboring cell with respect to the at least one base station connected to the second of the at least two digital master units.

21. A computer program comprising computer-executable instructions stored on a non-transitory computer readable storage medium, the computer-executable instructions being configured to cause the DAS to perform the steps recited in claim 1 when the computer-executable instructions are executed on at least one processing unit included in the DAS.

* * * * *